United States Patent [19]
Kondo

[11] Patent Number: 5,578,766
[45] Date of Patent: Nov. 26, 1996

[54] FORCE DETECTOR/INDICATOR

[75] Inventor: Makoto Kondo, Tokyo, Japan

[73] Assignee: NEC Corporation, Japan

[21] Appl. No.: 415,697

[22] Filed: Apr. 3, 1995

[30] Foreign Application Priority Data

Apr. 5, 1994 [JP] Japan .................................. 6-066993

[51] Int. Cl.⁶ ...................................................... G01L 1/00
[52] U.S. Cl. ........................................ 73/862.68; 310/339
[58] Field of Search ......................... 310/339; 73/DIG. 4, 73/708, 753, 862.68; 315/55, 209 PZ

[56]         References Cited

U.S. PATENT DOCUMENTS

| 2,691,159 | 10/1954 | Heibel ........................................ 310/339 |
| 3,808,418 | 4/1974 | Conrad et al. ............................ 315/55 |
| 4,748,366 | 5/1988 | Taylor ........................................ 310/339 |
| 4,943,752 | 7/1990 | Todd et al. ................................ 310/339 |

*Primary Examiner*—Richard Chilcot
*Assistant Examiner*—Ronald Biegel
*Attorney, Agent, or Firm*—Ostrolenk, Faber, Gerb & Soffen, LLP

[57]              ABSTRACT

A force detector/indicator is disclosed which is provided with a piezoelectric plate that generates voltage when subjected to operation force or pressure, and a liquid crystal display (LCD) having a threshold value sufficiently lower than the generated voltage of the piezoelectric plate, the piezoelectric plate and the liquid crystal display being electrically connected such that generated voltage from the piezoelectric plate acts as an input signal to turn on the display of the liquid crystal display. In addition, a high-resistance conductor for discharge is provided between the two electrode lines making up a circuit connecting the piezoelectric plate and liquid crystal display.

21 Claims, 6 Drawing Sheets

FORCE DETECTOR/INDICATOR

BACKGROUND OF THE INVENTION

1. Field of the Invention

The present invention relates to a device that detects and indicates operation force or pressure, and in particular to a force detector/indicator employing a piezoelectric element and a liquid crystal display.

2. Description of the Related Art

Figure 1:
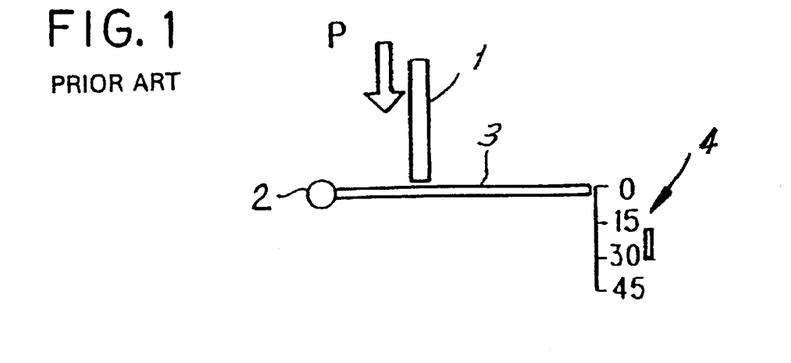
FIG. 1 is a schematic structural view showing a conventional force detector/indicator that employs a spring.

Conventionally, devices employing springs have been used for detecting and indicating operation force and pressure. As shown in FIG. 1, in one example of such a device an operation force or pressure P is applied to actuator 1 and the displacement of the tip of spring 3 centered on fulcrum 2 is indicated on scale 4.

Figure 2:
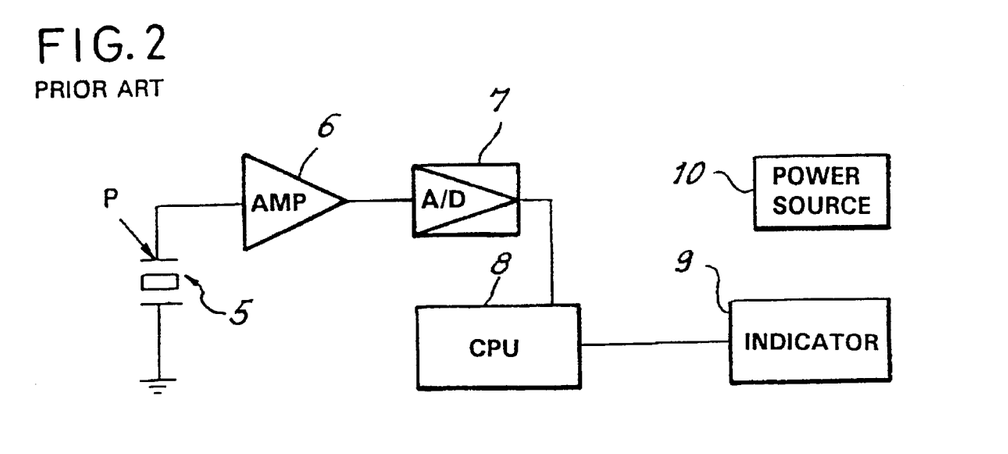
FIG. 2 is block diagram showing a conventional force detector/indicator that operates by means of an electronic circuit.

Another example of the prior art employs a piezoelectric body to detect and indicate operation force or pressure P. As shown in FIG. 2, such a device indicates the voltage generated by the piezoelectric effect when an operation force or pressure P is applied to piezoelectric plate 5 by means of a pressure gauge, the circuit structure of which includes voltage amplifying circuit (AMP) 6, A/D conversion circuit 7, CPU 8 for calculating correction, indicator 9 for displaying a numerical value of the pressure, and power source 10 for driving these components.

Figure 3:
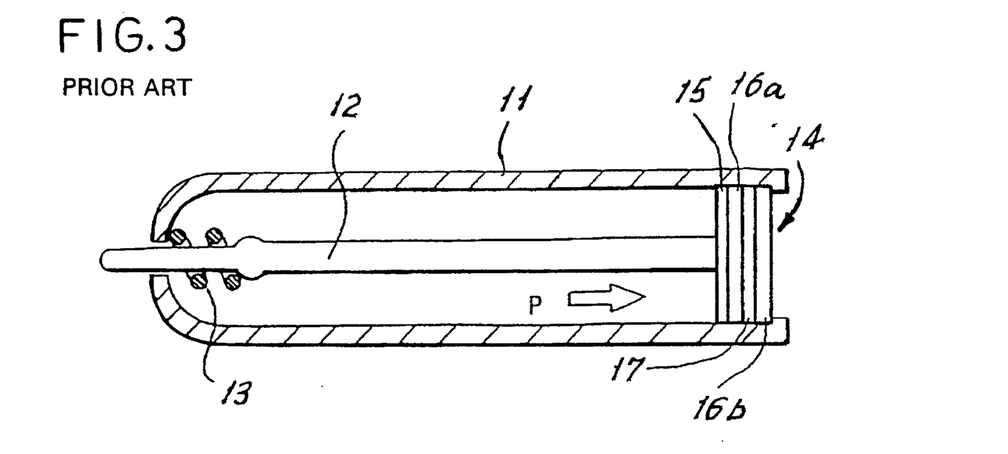
FIG. 3 is sectional view showing the structure of a conventional force detector/indicator that operates through direct pressure against a liquid crystal display.

Yet another example of the prior art indicates pressure applied directly against a liquid crystal display. As shown in FIG. 3, such a device is provided with liquid crystal display 14 composed of cylindrical retainer 11 holding liquid crystal layer 17 sandwiched between two glass plates 16a, 16b with reflective layer 15 applied to glass plate 16a, and arranged such that shaft 12 within retainer 11 is pressed against liquid crystal display 14 by spring 13, with the tip of shaft 12 protruding from retainer 11. In this type of liquid crystal display, when a pressure P is applied against the tip of shaft 12, pressure is applied to the liquid crystal display by the opposite end of shaft 12, which in turn squeezes liquid crystal layer 17 sandwiched between glass plates 16a, 16b, thereby clouding the display. An operator can detect changes in pressure by noting the degree of clouding of liquid crystal layer 17.

Nevertheless, a device employing a spring such as is shown in FIG. 1 is not suitable for miniaturization because it requires sufficient space for displacement of the spring to indicate operation force or pressure. Furthermore, the device shown in FIG. 2 which employs an electronic circuit requires a power source to operate the circuit, for which purpose a battery is usually employed. Consequently, even should miniaturization be attempted by using an IC as the electronic circuit, there remains the problem that space is still required for a battery, rendering such a device unsuitable for miniaturization. In addition, relative to the accuracy of indication of the operation force or pressure, such a device entails a high production cost.

Finally, in the device shown in FIG. 3 which uses pressure applied directly against a liquid crystal display, because pressure is indicated only by the degree of clouding of the liquid crystal, indication is unstable and the degree of applied pressure difficult to read.

SUMMARY OF THE INVENTION

In view of the above-described problems of the prior art, the object of the present invention is to provide a force detector/indicator that is both inexpensive and small enough to allow incorporation into a writing implement, work jig, or other device.

To achieve the above object, a force detector/indicator according to the present invention is provided with a piezoelectric plate that generates voltage when subjected to pressure; a liquid crystal display having a threshold level sufficiently lower than the generated voltage of the piezoelectric plate; electrode lines that electrically connect the electrodes of the piezoelectric plate and the liquid crystal display so as to convey generated voltage of the piezoelectric plate as an input signal to turn on the liquid crystal display. In addition, the above force detector/indicator may be conceived as a device provided with a piezoelectric plate that generates voltage when subjected to pressure, a liquid crystal display having a threshold level sufficiently lower than the generated voltage of the piezoelectric plate, electrode lines that electrically connect the electrodes of the piezoelectric plate and the liquid crystal display so as to convey generated voltage of the piezoelectric plate as an input signal to turn on the liquid crystal display, and a voltage-divider circuit provided between the electrode lines connecting the piezoelectric plate and the liquid crystal display that voltage-divides the generated voltage of the piezoelectric plate into differing voltage levels, the liquid crystal display having a plurality of display elements corresponding to each outputted voltage voltage-divided by the voltage-divider circuit, and the device being constructed such that each display element of the liquid crystal display turns on in succession with the increase of force against the piezoelectric plate. Further, the force detector/indicator may be added by a high-resistance conductive material provided between the electrode lines connecting the piezoelectric plate and the liquid crystal display for forming a discharge route.

The device may be provided with a piezoelectric plate that generates voltage when subjected to pressure, a liquid crystal display having a threshold level sufficiently lower than the generated voltage of the piezoelectric plate, electrode lines that electrically connect the electrodes of the piezoelectric plate and the liquid crystal display so as to convey generated voltage of the piezoelectric plate as an input signal to turn on the liquid crystal display, and a high-resistance conductive material provided as a voltage-divider circuit between the electrode lines connecting the piezoelectric plate and the liquid crystal display for voltage-dividing the generated voltage of the piezoelectric plate into differing voltage levels, the liquid crystal display having a plurality of display elements corresponding to each output voltage voltage-divided by the high-resistance conductive material, and the device being constructed such that the display elements of the liquid crystal display turn on in succession with the increase of force against the piezoelectric plate;

The device may be provided with a piezoelectric plate that generates voltage when subjected to pressure, a plurality of liquid crystal displays having a threshold level sufficiently lower than the generated voltage of the piezoelectric plate, electrode lines that electrically connect the electrodes of the piezoelectric plate and the liquid crystal displays so as to convey generated voltage of the piezoelectric plate as an input signal to turn on the liquid crystal displays, and a high-resistance conductive material provided between the electrode lines connecting the piezoelectric plate and the liquid crystal displays to form a discharge route, said plurality of liquid crystal displays being parallel connected to the piezoelectric plate, and moreover, these liquid crystal displays each having a different threshold level, the device being constructed such that each of the liquid crystal displays turns on in succession with the increase of force against the piezoelectric plate.

The high-resistance conductive material may also be provided on the electrodes of the piezoelectric plate and the liquid crystal display.

As the high-resistance conductive material, a conductive polymer material, a vacuum deposited thin film, or a conductive oil of from 10M to 10 GΩ may be used.

In the above-described device, it is preferable to provide a pressure plate that disperses the operation force or pressure and applies pressure against the piezoelectric plate in a suitable load distribution.

Further, this device is characterized in that it may be incorporated into a writing implement, a pen for inputting information to office automation equipment, a carving bit, needle, or jig for shiatsu massage, button, or key switch.

With the above-described construction of the preset invention, a generated voltage is produced by the piezoelectric plate when operation force or pressure is applied to the piezoelectric plate, and when this generated voltage exceeds the threshold level of the liquid crystal display, the liquid crystal display turns on. When pressure against the piezoelectric plate is removed, a reverse generated voltage is generally produced that is equivalent to the distortion energy applied to the piezoelectric plate, the display recovers to zero potential, and the liquid crystal display turns off instantaneously.

When pressure is applied against the piezoelectric plate for a long period of time, there is a natural discharge of energy from the electrodes of the piezoelectric plate and the liquid crystal display or from the electrode lines whereby generated voltage from the piezoelectric plate gradually decreases as the time of applied pressure increases.

When pressure against the piezoelectric plate is removed in this type of discharge state and the reverse generated voltage is generated corresponding to the distortion energy applied against the piezoelectric plate, the plate in some cases will not recover to zero potential, and a certain fixed voltage will electrify components of the piezoelectric plate and liquid crystal display, causing the liquid crystal display to be lit up even during times of no pressure. The charge in the components is consumed by natural discharge.

However, in the present invention, because a high-resistance conductive material for discharge is provided at the electrodes of the piezoelectric plate and liquid crystal display or in the electrode lines, the discharge time can be shortened without resorting to natural discharge to correct the above-described charge existing when no pressure is applied. Consequently, the liquid crystal display can be turned off in a suitable response time when pressure is removed from the piezoelectric plate.

This approach reduces false readings such as the reversal of readings between times when pressure is applied to the piezoelectric plate and times when pressure is removed, or the delayed clearing of a reading when no pressure is applied which is caused by electrification of peripheral components due to voltage applied to the liquid crystal display when pressure is applied to the piezoelectric plate. In addition, such a device can be made more compact and at a lower price and does not require space for batteries or mechanical movement.

Furthermore, in the present invention, generated voltage from the piezoelectric plate when pressure is applied is voltage-divided into various differing levels by means of a voltage-divider circuit made up of resistance or diodes, or by a high-resistance conductive material, and each voltage-divided output is impressed to a corresponding display element of the liquid crystal display, and when the output due to the voltage-divider circuit is greater than a threshold level of the liquid crystal display, the corresponding display element turns on.

Or, a plurality of liquid crystal displays having differing threshold levels are connected in parallel to the piezoelectric plate, whereby a liquid crystal display turns on when generated voltage from the piezoelectric plate exceeds the threshold level of that liquid crystal display.

Accordingly, with the increase in force against the piezoelectric plate, the display elements of the liquid crystal display, or the liquid crystal displays, each turn on in succession, thereby facilitating judgment of whether the operation force applied by the operator is greater than or less than the proper operation force. The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENTS

The First Embodiment

Figure 4:
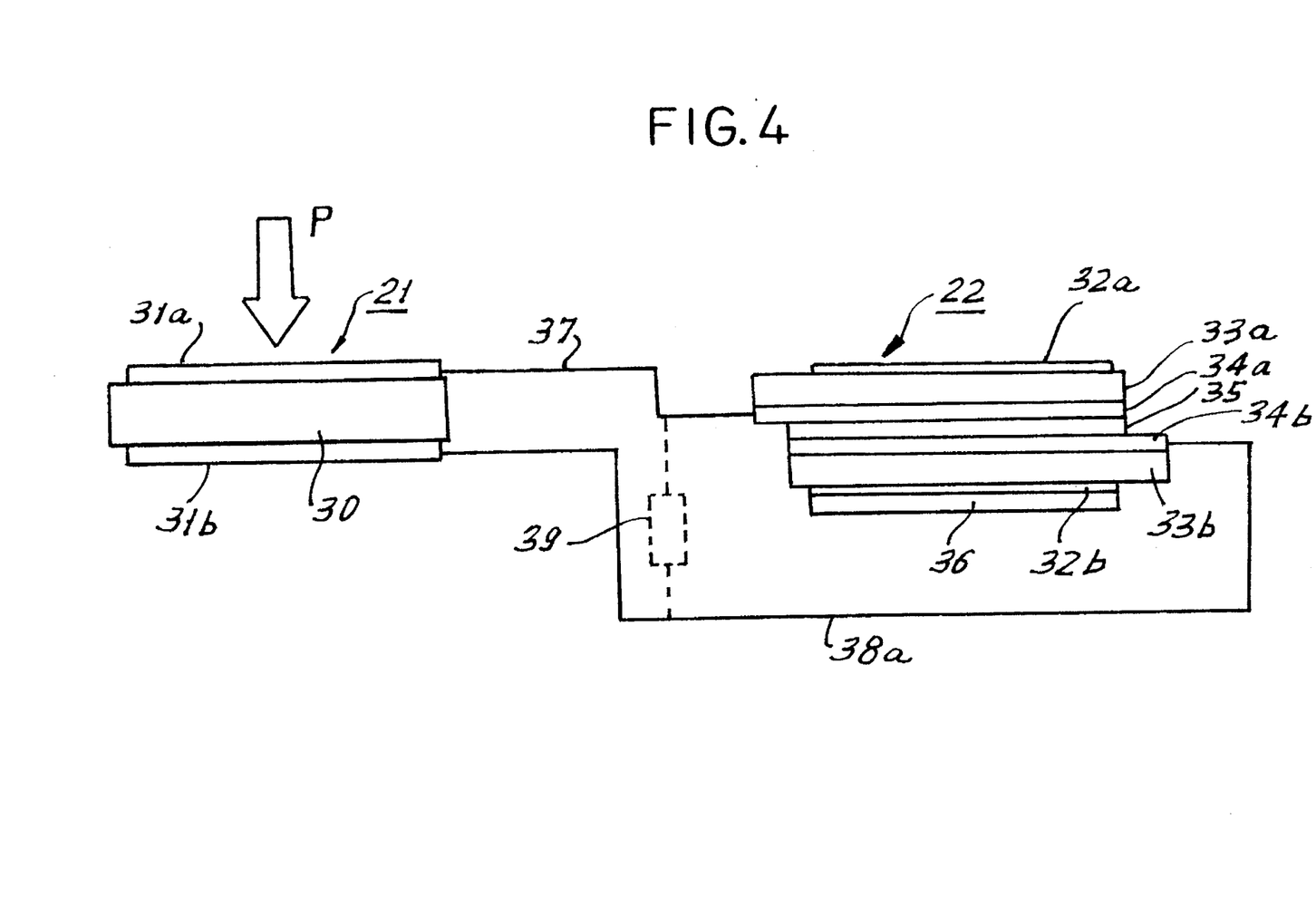
FIG. 4 is structural view showing a first embodiment of the force detector/indicator according to the present invention.

Explanation will first be presented for the first embodiment of the force detector/indicator according to the present invention, which, as shown in FIG. 4, is provided with a piezoelectric plate 21 that generates voltage when subjected to an operation force or pressure P, and a liquid crystal display (LCD) 22 having a threshold level which is sufficiently lower than the generated voltage of piezoelectric plate 21. Piezoelectric plate 21 and liquid crystal display 22 are electrically connected such that the display of liquid crystal display 22 lights up when the generated voltage of piezoelectric plate 21 is received as an input signal.

Piezoelectric plate 21 is constructed by forming electrode plate 31a on one surface of a piezoelectric material 30, for example PZT having from 30% to 60% longitudinal piezoelectric efficiency or transverse piezoelectric efficiency, and forming electrode plate 31b on the other surface of the piezoelectric material 30.

Electrode plates 31a, 31b are a general conductive material formed on piezoelectric material 30 using metal by such methods as vacuum deposition, plating, bonding, or paste printing 0.5 mm square or 5 mm circular plate having a thickness of from 0.1 mm to 1 mm may be used, but any size or shape suitable for the present device is possible. The piezoelectric material may be of materials such as, but not limited to, crystal, ceramics, and polyvinylidene fluoride.

As shown in FIG. 4, the liquid crystal display (LCD) is a known TN (Twisted Nematic) type composed of polarization plates 32a, 32b, glass plates 33a, 33b, electrode films 34a, 34b, liquid crystal layer 35, and reflective plate 36.

One end of electrode line 37 is connected to the electrode plate 31a of piezoelectric plate 21, and the other end of that electrode line 37 is connected to electrode film 34a of liquid crystal display 22. Similarly, one end of electrode line 38 is connected to electrode plate 31b of piezoelectric plate 21 and the other end of that electrode line 38 is connected to electrode film 34b of liquid crystal display 22.

Figure 5:
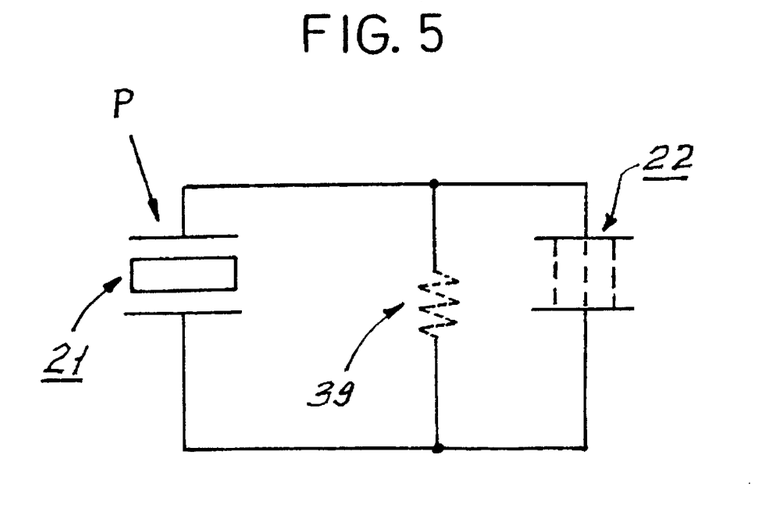
FIG. 5 is a circuit diagram of the force detector/indicator shown in FIG. 4.

For discharge purposes, a high-resistance conductor 39 of from 10M to 10 GΩ is connected between electrode lines 37 and 38. Rather than using an electrical part as resistance, a conductive polymer such as a vaporized thin-film (for example, ITO), conductive oil, or carbon silicone rubber or carbon fiber is used as the high-resistance conductor 39. In FIGS. 4 and 5, high-resistance conductor 39 is indicated by dotted lines to indicate that an electric part is not used as resistance. Furthermore, a high-resistance conductor 39 may also be provided at the electrode plates 31a, 31b of piezoelectric plate 21 and the electrode films 34a, 34b of liquid crystal display 22.

The present embodiment is intended for detecting an operation force or pressure P of from 10 gf to 500 gf, a force typical in pencils or ball-point pens used in general office work or in pens, buttons or key switches used for input of information in office automation. A suitable point pressure for a writing implement is of the order of 100 gf. Piezoelectric plate 21 is constructed so as to generate a voltage of from 5 V to 15 V when subjected to this level of operation force or pressure P.

Figure 6:
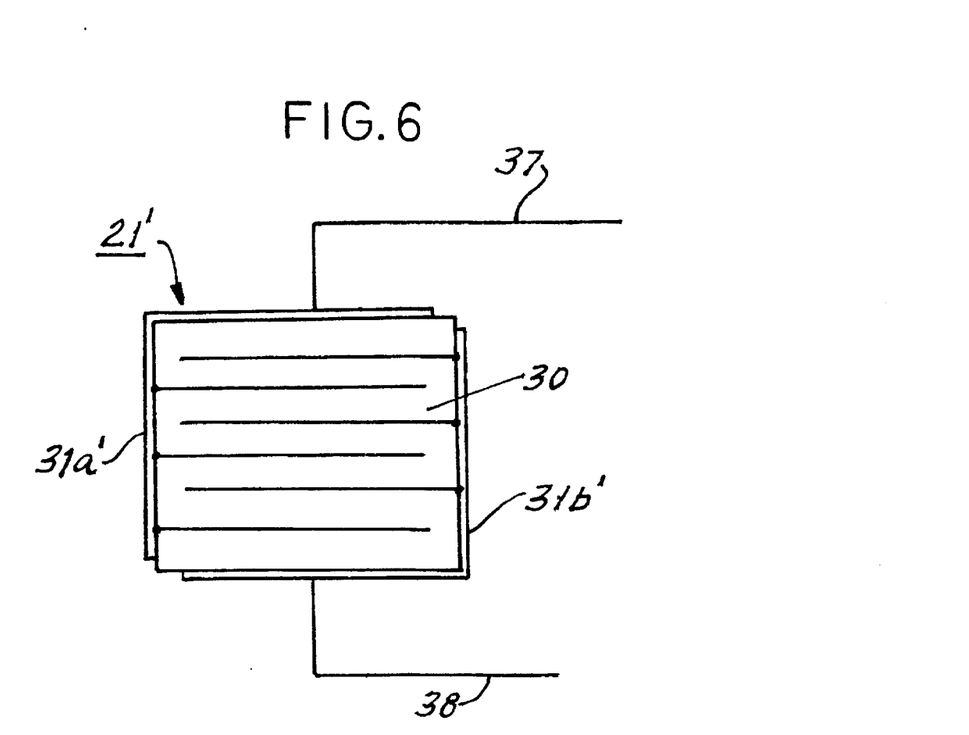
FIG. 6 is a sectional view showing a different example of the structure of a piezoelectric plate.

Cases in which the generated voltage of the piezoelectric plate 21 is insufficient can be met by forming piezoelectric plate 30 as a plurality of laminations. As an example, consider piezoelectric plate 21' shown in FIG. 6, a multilayer piezoelectric plate of seven-layer structure in which electrode film 31a and electrode film 31b are alternately sandwiched between piezoelectric material 30. Through the use of this type of piezoelectric plate 21', a higher voltage can be generated in response to equivalent pressure than the piezoelectric plate 21 shown in FIGS. 4 and 5.

The threshold level of liquid crystal display 22 is set at between 2 V and 3 V, a level sufficiently lower than the generated voltage of piezoelectric plate 21. In the applications of the present device, the effects of temperature do not pose a significant problem.

In a force detector/indicator according to the above-described construction, application of operation force or pressure P against piezoelectric plate 21 gives rise to generated voltage from piezoelectric plate 21, and when this generated voltage exceeds the threshold level of liquid crystal display 22, liquid crystal display 22 turns on. When the pressure against piezoelectric plate 21 is removed, generally, a reverse generated voltage is produced that is equivalent to the distortion energy applied to piezoelectric plate 21, whereupon zero electric potential is recovered, and the liquid crystal display turns off instantly.

However, when pressure is applied against piezoelectric plate 21 for a long interval of time, natural discharge occurs at the electrodes of piezoelectric plate 21 and liquid crystal display 22 or within electrode lines 37, 38, and the generated voltage from piezoelectric plate 21 gradually drops as the time of applied pressure lengthens.

When the pressure applied against piezoelectric plate 21 is removed during such a discharge state and a reverse generated voltage occurs that is proportionate to the distortion energy applied to the piezoelectric plate 21, zero electric potential is not recovered, and a fixed voltage electrifies the constituent elements of the piezoelectric plate 21 and liquid crystal display 22, causing the liquid crystal display 22 to turn on even when no pressure is applied. The voltage electrifying these constituent elements is expended through natural discharge.

In the present embodiment, by providing high-resistance conductors 39 at the electrodes of piezoelectric plate 21 and liquid crystal display 22 or between electrode lines 37, 38, the discharge time can be corrected to a short time without resorting to natural discharge of the above-described charge during times when no pressure is applied, and consequently, liquid crystal display 22 can be turned off in a suitable response time upon release of pressure against piezoelectric plate 21.

As a result, a force detector/indicator is realized that is stable and that does not give rise to false readings such as the delayed clearing of the liquid crystal display 22 due to electrification of constituent elements of the device even when no pressure is applied which is caused by voltage applied to liquid crystal display 22 when pressure is applied, or reversal of the display content upon application or removal of pressure against the piezoelectric material.

In dealing with a piezoelectric plate of small size when miniaturizing a device, there is the concern that a sufficient generated voltage cannot be obtained from the operation force or pressure P to be detected, making the display unstable and inaccurate. However, by setting the threshold level of the liquid crystal display to a level sufficiently lower than the generated voltage of the piezoelectric plate, the size of a piezoelectric plate is limited only by the threshold level of the liquid crystal display, thereby allowing miniaturization of the device.

Second Embodiment

Next will be explained a second embodiment of the present invention. Constituent elements of the present embodiment that are identical to elements of the first embodiment will be referenced by the same numbers, and redundant explanation will be omitted.

The present embodiment relates to a force detector/indicator which detects and indicates operation force or pressure on a shaft adapted for the various functions and which can be used in work requiring regulated force such as in writing implements, carving bits, needles, or utensils for shiatsu (massage).

Figure 7:
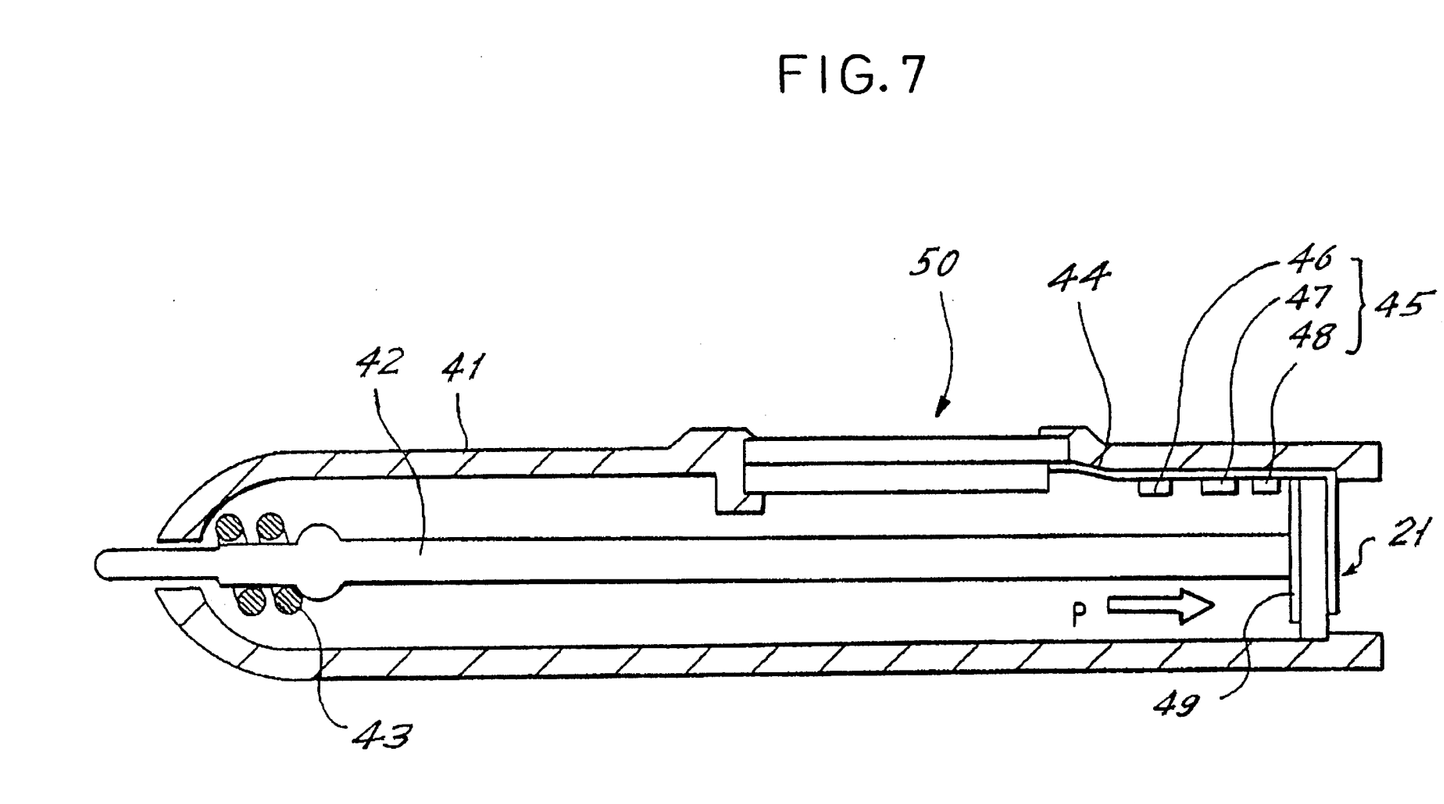
FIG. 7 is a sectional view showing the structure of a second embodiment of the force detector/indicator according to the present invention.

As shown in FIG. 7, this device is provided with a cylindrical housing 41. Within the housing 41 is held a piezoelectric plate 21 identical to that of the first embodiment together with a shaft 42 which is arranged so as to press against the piezoelectric plate 21 under the spring pressure of a spring 43, the tip of the shaft 42 protruding from the housing 41.

On the side of the housing 41 is provided a liquid crystal display 50 of TN-type of construction identical to that of the first embodiment.

Figure 8:
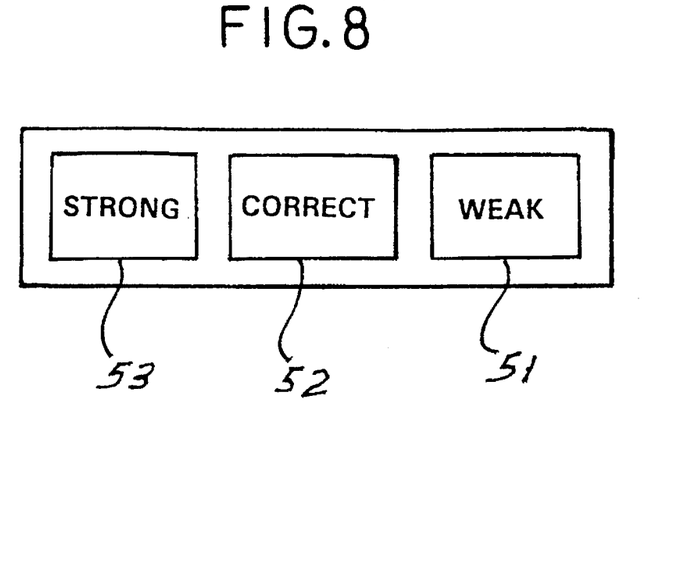
FIG. 8 is a view showing an example of the display configuration of the liquid crystal display shown in FIG. 7.

As shown in FIG. 8, the liquid crystal display 50 has three display elements 51, 52, 53 which indicate the state of applied pressure in three levels, "strong," "correct," and "weak." These display elements 51, 52, 53 divide the electrode film on the visible side and are a portion of the liquid crystal display 50 that corresponds to a pattern produced in the form of a prescribed design or mark. In the present embodiment, as in the first embodiment, the threshold level of liquid crystal display 50 having display elements 51, 52, 53 is set to a level sufficiently lower than the generated voltage of piezoelectric plate 21. Piezoelectric plate 21 and liquid crystal display 50 are electrically connected by means of a FPC plate (flexible plate circuit) 44 within retainer 41. On FPC plate 44 is provided a voltage-divider circuit 45 made up of resistance 46, 47, 48 each of a differing level.

Figure 9:
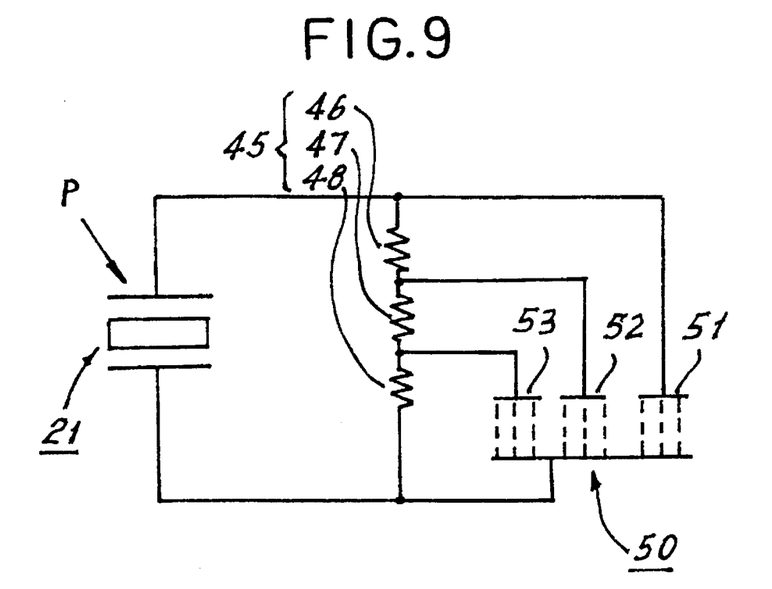
FIG. 9 is a circuit diagram of the pressure indicator shown in FIG. 7.

In concrete terms, as shown in FIG. 9, the circuit between piezoelectric plate 21 and liquid crystal display 50 is constructed such that voltage generated by the piezoelectric effect when piezoelectric plate 21 is subjected to operation force or pressure P is voltage-divided into differing levels by resistance 46, 47, 48, respectively, of voltage-divider circuit 45, and each output produced upon voltage division by the voltage-divider circuit 45 is impressed to a respective display element 51, 52, 53 of liquid crystal display 50.

In the present embodiment, of the voltage outputted from voltage-divider circuit 45, the voltage impressed to display element 51 is the largest, and voltage of progressively smaller amounts is impressed to display elements 52 and 53.

Further, in the interest of preventing false readings due to charge, it is preferable that voltage-divider circuit 45 be composed of resistance 46, 47, and 48 be structured on an FPC plate 44 of identical structure to that of the high-resistance conductor described in the first embodiment.

As shown in FIG. 7, one surface of FPC plate 44 connected to the electrode on the pressure-receiving side of piezoelectric plate 21 also serves as a pressure plate 49 having a shape suitable for dispersing the operation force or pressure P transmitted by shaft 42 into an optimum distribution and applying pressure against the piezoelectric plate 21. In the present embodiment, FPC plate 44 is made flat so as to evenly distribute the pressure applied by shaft 42, but to concentrate the load distribution at one point, FPC plate 44 may be formed with a projection directed toward piezoelectric plate 21 or a protuberance may be adhered to FPC plate 44.

In a device constructed according to the above-described embodiment, a display element is turned on when output of voltage-divider circuit 45 is greater than the threshold level of liquid crystal display 50. In other words, as the operation force or pressure P increases, first display element 51 alone turns on, then display elements 51 and 52 turn on, and finally display elements 51, 52, and 53 all turn on, whereby an operator can be accurately apprised of the operation force or pressure P in terms of the three levels "strong," "correct," and "weak."

The display content of the liquid crystal display (LCD) 50 in the present embodiment is formed by etching the electrode film on the visible side in a set pattern, and any pattern may be used that informs the operator of the proper operation force and indicates to the operator in an easily understandable manner whether the operation force is greater than or less than ideal.

Figure 10:
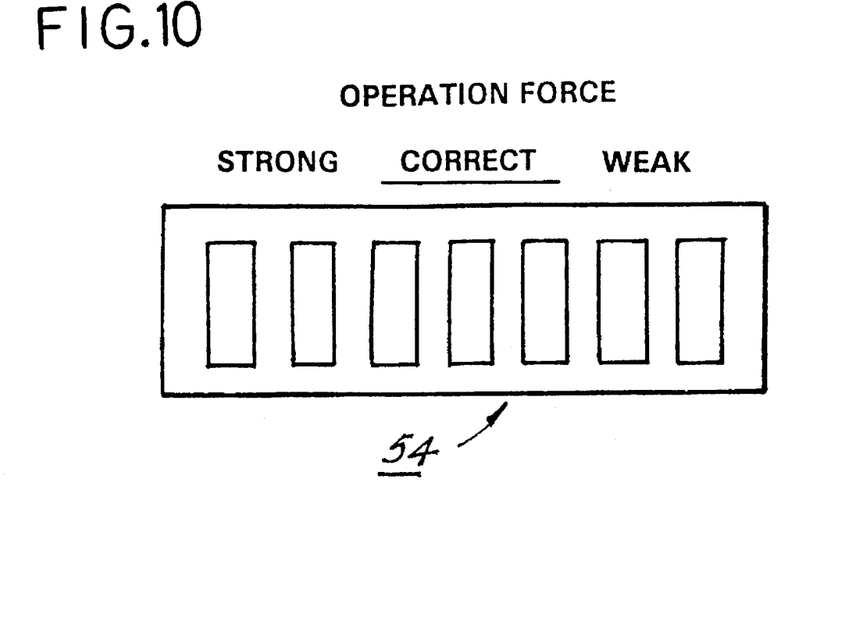
FIG. 10 is a view showing another example of the display of a liquid crystal display.

For example, as shown in FIG. 10, a liquid crystal display (LCD) 54 employing a bar graph composed of a plurality of display elements may be used.

Figure 11:
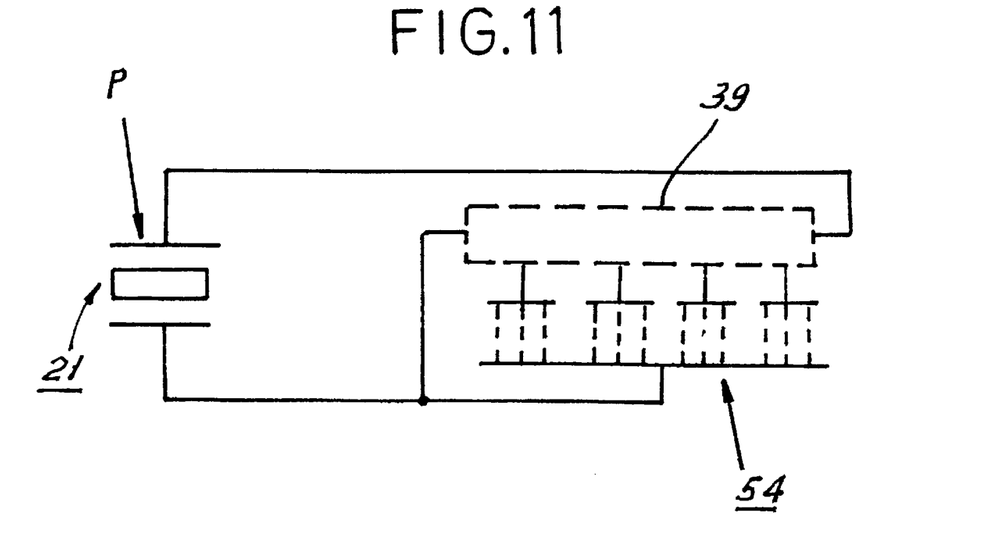
FIG. 11 is a circuit diagram of a device in which the display example shown in FIG. 10 is applied.

In this construction, the number of electrodes increases, and the electric charge electrifying the constituent elements of the piezoelectric plate 21 and liquid crystal display 54 also increases. In the interest of preventing false readings, it is therefore preferable that the voltage-divider circuit be composed of high-resistance conductor 39 described in the first embodiment, as shown in FIG. 11. In FIG. 11, the voltage-divider circuit is represented in dotted lines to indicate that it is composed not of resistance in the form of electric parts, but of high-resistance conductor 39.

In the present embodiment, operation force or pressure applied to the tip of shaft 42 is indicated by a plurality of display elements, but it is of course possible to use only one display element. The voltage-divider circuit is composed of resistance, but a diode may also be employed.

Further, although the present embodiment employs a liquid crystal display having a plurality of display elements and is constructed such that display elements turn on in succession with the increase in operation force or pressure P, the present invention is not limited to this construction and may instead employ a plurality of liquid crystal displays. In other words, a plurality of liquid crystal displays may be connected in parallel with the piezoelectric plate, the liquid crystal displays each having a different threshold level such that the liquid crystal displays turn on in succession with the increase in the operation force or pressure P.

The present invention as described hereinabove employs a piezoelectric material to detect operation force or pressure and is constructed such that a voltage of very small electrical energy obtained from the piezoelectric material can be effectively displayed by means of an liquid crystal display, thereby realizing a compact device that requires no space for batteries or mechanical displacement. Furthermore, by providing high-resistance conductors that discharge electrical charge in the piezoelectric plate and liquid crystal display or in each portion of the constituent elements at the electrodes of the piezoelectric plate and liquid crystal display or in the electrode lines connecting each of the parts, a stable display free of false readings can be obtained. Still further, simple construction and connections allows inexpensive manufacture of the device.

In the present invention, voltage obtained from a piezoelectric plate is voltage-divided by means of a voltage-divider circuit and each voltage-divided output is made to correspond to a display element of the liquid crystal display, or a piezoelectric plate is parallel connected to a plurality of liquid crystal displays having differing threshold levels, and therefore, operation force or pressure can be indicated in a plurality of levels, allowing easy judgment of whether an operator's operation force is stronger than or weaker than the ideal operation force. In this case as well, miniaturization and lower production costs can be realized through simple connection and construction.

In the present invention, provision of a pressure plate that applies pressure to the piezoelectric material in a suitable load distribution enables a stable indication with few false readings.

Finally, the present invention can be incorporated into a writing implement, a pen for inputting information to office automation equipment, a carving bit, needle, an instrument for shiatsu (massage), a button, or a key switch.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A force detector/indicator comprising:

a piezoelectric plate that generates voltage when subjected to pressure, said piezoelectric plate having electrodes; and a liquid crystal display having a threshold level, for activating said liquid crystal display, sufficiently lower than generated voltage of said piezoelectric plate, said liquid crystal display having electrodes;

electrode lines that electrically connect said electrodes of said piezoelectric plate and said liquid crystal display so as to convey generated voltage of said piezoelectric plate as an input signal to turn on said liquid crystal display;

wherein a high-resistance conductive material is between said electrode lines electrically connecting said piezoelectric plate and said liquid crystal display for the purpose of forming a discharge route, said high-resistance conductive material is at said electrodes of said piezoelectric plate and said liquid crystal display.

2. A force detector/indicator according to claim 1, wherein a conductive polymer, a vacuum deposited thin film, or a conductive oil of from 10M to 10 GΩ is used as said high-resistance conductive material.

3. A force detector/indicator according to claim 1, wherein a pressure plate is provided for applying pressure against said piezoelectric plate by dispersing operation force or pressure into a suitable load distribution.

4. A force detector/indicator according to claim 1, wherein said force detector/indicator is incorporated into a writing implement.

5. A force detector/indicator according to claim 1, wherein said force detector/indicator is incorporated in a pen for inputting information to automatic office equipment.

6. A force detector/indicator according to claim 1, wherein said force detector/indicator is incorporated in a carving bit.

7. A force detector/indicator according to claim 1, wherein said force detector/indicator is incorporated in a needle.

8. A force detector/indicator according to claim 1, wherein said force detector/indicator is incorporated in an instrument for shiatsu massage.

9. A force detector/indicator according to claim 1, wherein said force detector/indicator is incorporated in a button.

10. A force detector/indicator according to claim 1, wherein said force detector/indicator is incorporated in a key switch.

11. A force detector/indicator comprising:

a piezoelectric plate that generates voltage when subjected to pressure, said piezoelectric plate having electrodes;

a liquid crystal display having a threshold level, for activating said liquid crystal display, sufficiently lower than generated voltage of said piezoelectric plate, said liquid crystal display having electrodes;

electrode lines that electrically connect said electrodes of said piezoelectric plate and said liquid crystal display so as to convey generated voltage of said piezoelectric plate as an input signal to turn on said liquid crystal display; and a voltage-divider circuit provided between said electrode lines connecting said piezoelectric plate and said liquid crystal display for voltage-dividing generated voltage of said piezoelectric plate into differing levels;

said liquid crystal display having a plurality of display elements corresponding to each output voltage being voltage-divided by said voltage-divider circuit;

said force detector/indicator wherein each display element of said liquid crystal display turns on in succession with increase of force against said piezoelectric plate.

12. A force detector/indicator according to claim 11, wherein a pressure plate is provided for applying pressure against said piezoelectric plate by dispersing operation force or pressure into a suitable load distribution.

13. A force detector/indicator according to claim 11, wherein said force detector/indicator is incorporated into a writing implement.

14. A force detector/indicator comprising:

a piezoelectric plate that generates voltage when subjected to pressure, said piezoelectric plate having electrodes;

a liquid crystal display having a threshold level, for activating said liquid crystal display, sufficiently lower than generated voltage of said piezoelectric plate, said liquid crystal display having electrodes;

electrode lines that electrically connect said electrodes of said piezoelectric plate and said liquid crystal display so as to convey said generated voltage of said piezoelectric plate as an input signal to turn on said liquid crystal display; and a high-resistance conductive material provided as a voltage-divider circuit between said electrode lines connecting said piezoelectric plate and said liquid crystal display for voltage-dividing said generated voltage of the piezoelectric plate into differing levels;

said liquid crystal display having a plurality of display elements corresponding to each output voltage being voltage-divided by said high-resistance conductive material;

said force detector/indicator wherein each display element of said liquid crystal display turns on in succession with an increase of force against said piezoelectric plate.

15. A force detector/indicator according to claim 14, wherein a conductive polymer, a vacuum deposited thin film, or a conductive oil of from 10M to 10 GΩ is used as said high-resistance conductive material.

16. A force detector/indicator according to claim 14, wherein a pressure plate is provided for applying pressure against said piezoelectric plate by dispersing operation force or pressure into a suitable load distribution.

17. A force detector/indicator according to claim 14, wherein said force detector/indicator is incorporated into a writing implement.

18. A force detector/indicator comprising:

a piezoelectric plate that generates voltage when subjected to pressure;

a plurality of liquid crystal displays having a threshold level, for activating said liquid crystal display, sufficiently lower than generated voltage of said piezoelectric plate, said liquid crystal display having electrodes;

electrode lines that electrically connect said electrodes of said piezoelectric plate and said liquid crystal displays so as to convey said generated voltage of said piezoelectric plate as an input signal to turn on said liquid crystal displays; and a high-resistance conductive material provided between said electrode lines connecting said piezoelectric plate and said liquid crystal displays for forming a discharge route;

said liquid crystal displays being connected parallel to said piezoelectric plate, and said liquid crystal displays each having a different threshold level;

said force detector/indicator wherein each of said liquid crystal displays turns on in succession with an increase of force against said piezoelectric plate.

19. A force detector/indicator according to claim 18, wherein a conductive polymer, an vacuum deposited thin film, or a conductive oil of from 10M to 10 GΩ is used as said high-resistance conductive material.

20. A force detector/indicator according to claim 18, wherein a pressure plate is provided for applying pressure against said piezoelectric plate by dispersing operation force or pressure into a suitable load distribution.

21. A force detector/indicator according to claim 18, wherein said force detector/indicator is incorporated into a writing implement.

* * * * *